Dec. 6, 1960 M. W. FORTH 2,962,818
CONVEYOR FOR CROP DRIERS
Filed June 4, 1958
2 Sheets-Sheet 1
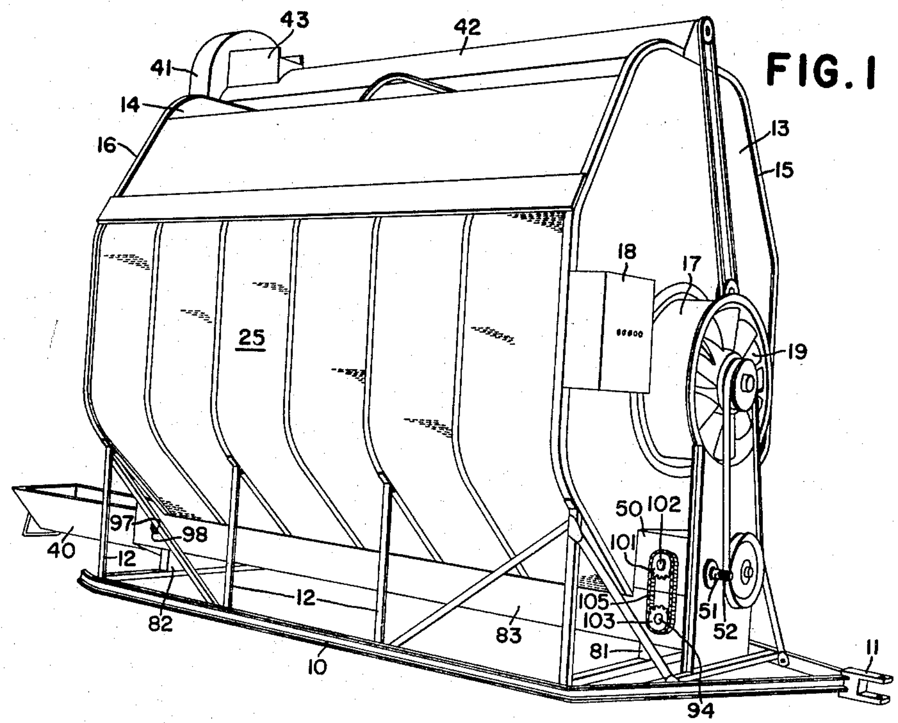
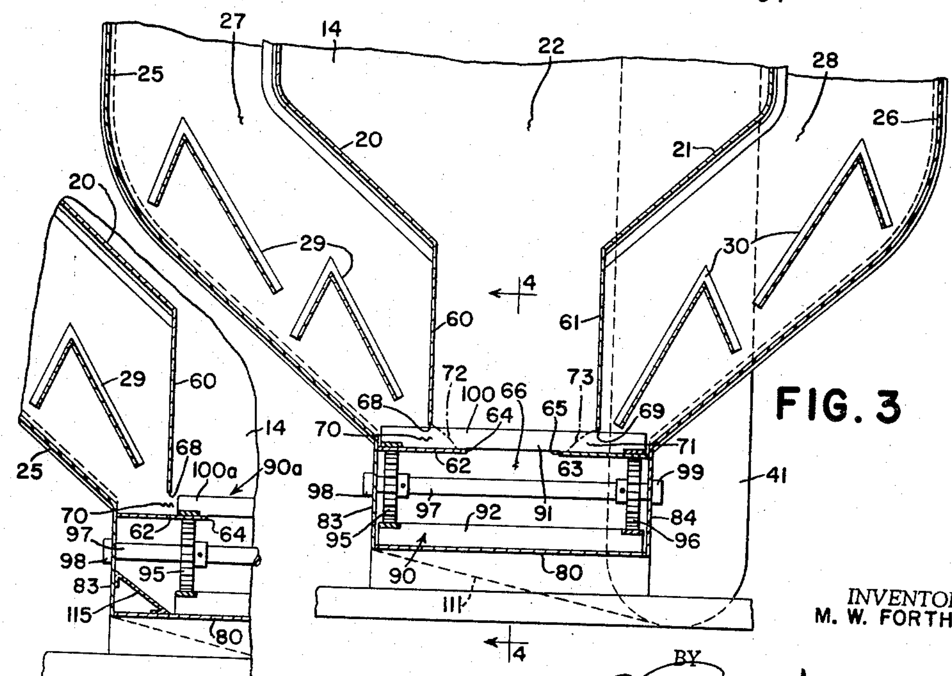
INVENTOR.
M. W. FORTH
BY C. Parker and W. A. Murray
ATTORNEYS Dec. 6, 1960
M. W. FORTH
2,962,818
CONVEYOR FOR CROP DRIERS
Filed June 4, 1958
2 Sheets-Sheet 2
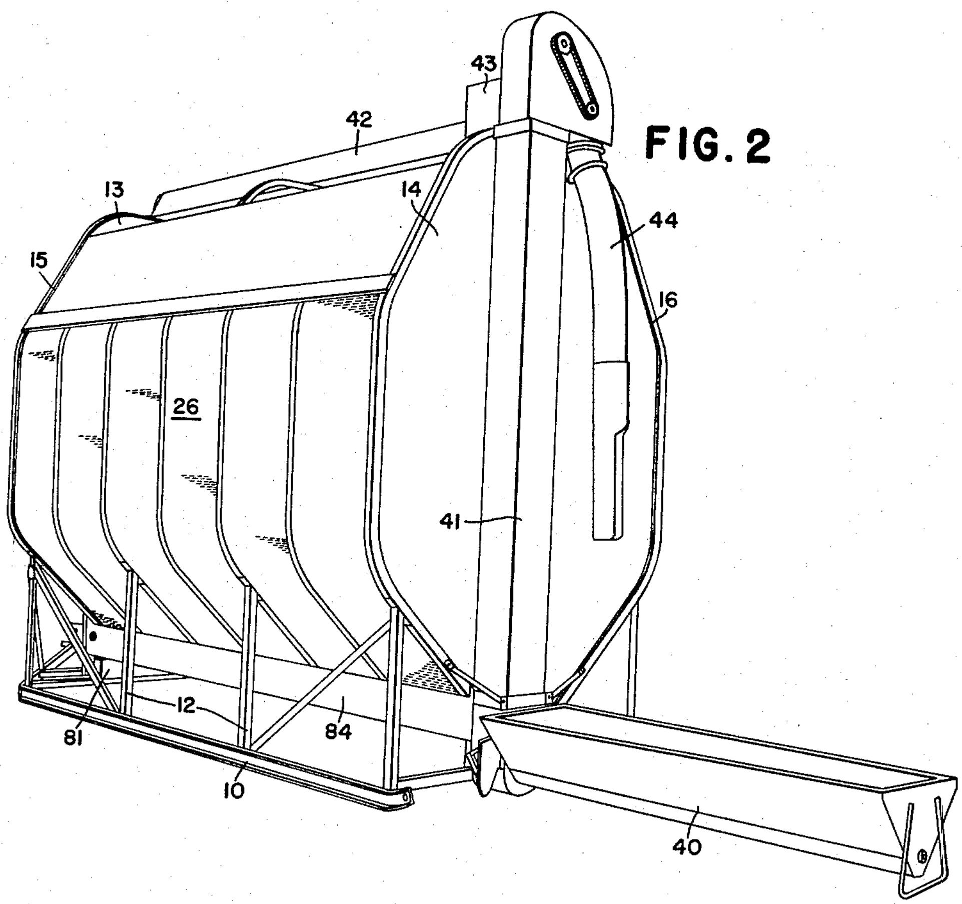
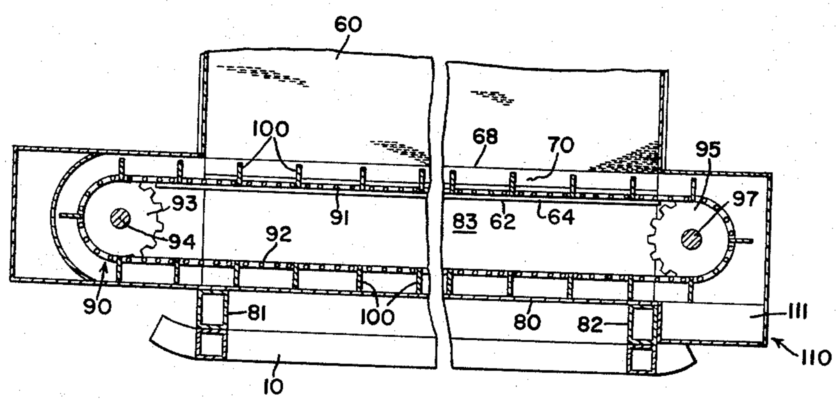
FIG. 4
INVENTOR.
M. W. FORTH
BY
C. L. Parker and W. A. Murray
ATTORNEYS

United States Patent Office 2,962,818
Patented Dec. 6, 1960

2,962,818

CONVEYOR FOR CROP DRIERS

Murray W. Forth, Moline, Ill., assignor, by mesne assignments, to Deere & Company, a corporation of Delaware Filed June 4, 1958, Ser. No. 739,795

11 Claims. (Cl. 34—167)

This invention relates to a crop drier and more particularly to the discharge means for effecting movement of the crop from the crop drier.

The conventional type of crop drier includes a centrally located air heating means with a blower associated therewith for effecting movement of the air into an elongated plenum chamber formed of perforated walls which serve also as the inner wall of a large crop drying chamber. The crop drying chamber is further characterized by having an outer wall spaced from the inner or plenum chamber wall. The crop drying chamber is generally vertically disposed and crops are fed in the upper section of the chamber and are permitted to gravitate to a lower conveyor at the base of the drier. The walls of the outer wall are also perforated and the perforations therein operate in conjunction with the perforations of the plenum chamber to permit the warm air to pass through the crop drying chamber. This, of course, causes the crop to dry as it gravitates through the chamber.

In one of the more conventional type of driers, the aforesaid plenum chamber is horizontally disposed so that it cooperates with the outer wall structure to form a pair of vertically disposed crop drying chambers on opposite sides of the plenum chamber so that the grain generally surrounds the plenum chamber. Also, there is normally the provision of a single conveyor at the bottom of the drier which operates to discharge grain from both of the chambers, the chambers being formed to converge toward one another at the base of the drier so as to feed into the single conveyor. Since the driers are generally of considerable height, there is a considerable pressure build-up in the column of grain so that having an unrestricted opening at the base of the column would cause gravitational discharge at too high a rate to permit the grain to satisfactorily dry and would also discharge at a greater rate than the capacity of a normal conveyor. Therefore, there is required for efficient discharge of the grain from the crop drier a means for feeding the grain to the conveyor in which the grain can be generally controlled relative to its rate of discharge. Also, due to the pressure build-up in the column of grain in the crop drying chamber, a direct feed to the conveyor in many instances would cause kernels of the grain to be ground by the conveyor resulting in a reduced quality of grain.

It is therefore the primary object of the present invention to provide a discharge conveyor at the base of the crop drier which serves basically to discharge the grain at a relatively even flow.

It is specifically proposed in the present invention to provide a pair of vertically disposed discharge openings running longitudinally of the crop drier. Provided also is a pair of laterally disposed shelf members having inner terminal edges inward of the crop drying chambers and forming between them a longitudinally extending slot or opening. The upper surface of the shelves serve as the lower closure member of the aforementioned discharge opening. Also provided is a floor panel positioned beneath the longitudinal slot or opening. A continuous type of conveyor having an upper run riding over the shelf members and a lower run riding over the floor panel is provided. The endless conveyor has thereon a series of longitudinally spaced transverse flights, the flights of the upper run being positioned proximate the discharge openings of the crop drying chambers and the flights of the lower run being positioned to sweep the grain along the floor panel. The shelves extend inwardly of the discharge openings and grain gravitating through the discharge openings will tend to seek a level on the shelves but will not discharge into the slot between the shelves. The conveyor sweeping over the shelves will tend to dislodge the grain of the shelves and due to the back pressure within the crop drying chambers will sweep the grain into the central slot where it will gravitate onto the floor panel where the flights of the lower run will move it to a discharge end of the conveyor.

In one form of the invention, the flights of the conveyor will be sufficiently wide to extend into the crop drying chambers for purposes of agitating the grain or crop within those chambers to permit an even flow of corn onto the shelves. In a modification of the invention, the flight conveyors will terminate substantially at the discharge openings and will not serve as agitating means but only as means for sweeping the grain into the longitudinal slot between the shelves.

Other objects and advantages of the present invention will become apparent to those skilled in the art as the nature of the invention is better understood from the following description as illustrated in the accompanying drawings.

Fig. 1 is a front and side perspective of the crop drier.

Fig. 2 is a rear and side perspective of the crop drier.

Fig. 3 is a partial vertical sectional view looking rearwardly of the lower portion of the crop drier.

Fig. 4 is a sectional view taken substantially along the line 4—4 of Fig. 3.

Fig. 5 is a partial sectional view similar to Fig. 3 and showing a modification of the invention.

The crop drier includes a main frame 10 which normally rests against the ground. Provided with the crop drier are optional wheels, not shown, by which the drier may be transported, or for purposes of moving short distances, the frame 10 may be dragged across the ground. At the forward end of the main frame 10 is a clevis type connection 11 which may be connected to a tractor for purposes of movement. The main frame 10 includes a series of vertical frames 12 which have their upper ends supporting the framework of the drier proper.

The crop drier itself includes a pair of longitudinally spaced apart front and rear end walls 13, 14 respectively. At the edge of the walls 13, 14 are angle iron framework 15, 16. Provided at the forward end of the drier is a furnace or heating means 17 and its associated control panel 18. The furnace includes a blower, as indicated by its blades 19, which drives the heated air centrally and longitudinally of the drier. Internally of the crop drier is a longitudinal plenum chamber composed of inner wall structures 20, 21 on opposite sides of the heated central area of the drier. The wall structures 20, 21 are perforated to permit air to pass. Also provided are outer wall structures 25, 26 which are spaced from the inner or plenum chamber wall structures 20, 21 respectively to form with the latter vertically disposed crop drying chambers 27, 28 respectively. The outer wall structures 25, 26 are also perforated to permit passage of air thereby operating in conjunction with the inner wall structures 20, 21 to permit air to pass from the plenum chamber, through the inner wall structures 20, 21, through the grain or crop contained in the chambers 27, 28, and outwardly through the perforations in the wall structures 25, 26. Provided in the crop drying chambers 27, 28 are baffles 29, 30 which serve to guide the grain in its downward descent. The drying chambers 27, 28 are in converging relation to one another beneath the heating area and both columns of drying chambers 27, 28 are inclined downwardly and inwardly at their lower portions.

Other structure inherent with this type of crop drier includes a hopper 40 into which the crop may be discharged and which feeds the crop into an elevator 41 at the rear end of the drier. The elevator 41 feeds the crop into an overhead conveyor indicated in its entirety by its housing 42, which discharges the crop into the crop drying chambers 27, 28. A small hopper 43 at the forward end of the conveyor 42 receives the grain directly from the elevator 41. The discharge spout 44 is provided with the elevator 41 so that the grain may be discharged into a wagon or other type of container after the grain has been dried. Control mechanism, not shown, is provided to control discharge either into the hopper 43 or in the discharge spout 44.

The drive mechanism for operating the various conveyors and elevators and furnace blower is provided through a drive transmission located under housing 50. The transmission receives its power through a main drive shaft 51 which is splined as at 52 for connection to a power take-off shaft on a tractor. The exact drive connection to the various operating mechanism on the crop drier, while not shown and described in detail, is conventional and for purposes of the present invention is not important other than to recognize that suitable mechanism does exist.

Referring now to Figs. 3 and 4, the lower portion of the crop drier includes a pair of vertically disposed and elongated panel members 60, 61 which are connected to the inner wall structures 20, 21 and operates to close the lower end of the crop drying chambers 27, 28 except for discharge openings 70, 71 herein to be described. The panel members 60, 61 are shown as integral and as continuous with the wall structures 20, 21. However, this is for purposes only of illustration and the exact nature of connection to the wall structures 20, 21 is not important. A pair of laterally disposed and substantially coplanar shelf members are connected to the outer wall structures 25, 26 and extend inwardly from the outer wall structures 20, 21 respectively to longitudinally extending and opposed inner edges 64, 65 which form an elongated opening or slot 66. The shelf members 62, 63 extend the length of the crop drier and consequently the slot 66 also extends the length of the drier. The upper surface of the shelf members 62, 63 are spaced below lower edges 68, 69 of the respective vertical panels 60, 61 to form the crop discharge openings 70, 71 for the crop drying chambers 27, 28. In the normal gravitational flow of crops through the crop drying chambers 27, 28 a portion of the crop can pass through the openings 70, 71 and will remain on the shelves 62, 63 to the level indicated by the lines 72, 73 of Fig. 3. Unless removed, the grain will normally pile to the extent shown by the lines 72, 73 and will at that point resist further movement of the grain out of the crop drying chambers 27, 28.

Positioned beneath and spaced from the shelves 62, 63 is a floor panel 80. The floor panel 80 is mounted on a pair of transverse structural members 81, 82 at the front and rear end of the crop drier. Connecting the outer ends of the shelf members 62, 63 and the floor panel 80 are a pair of upright wall panels 83, 84. As may be seen from the drawings, the floor panel 80 and the respective side panels 83, 84 serve as the housing for the discharge conveyor 90, hereafter to be described, at the base of the crop drier.

The discharge conveyor 90 is of the endless chain type having an upper run 91 and a lower run 92 and is mounted over a pair of drive sprockets, the left drive sprocket being shown at 93 in Fig. 4 and the right drive sprocket not being shown, which are mounted on a drive shaft 94 extending through the opposite sides of the respective sides 83, 84. The conveyor 90 is also mounted at its rear over a pair of idler sprockets 95, 96. The sprockets 95, 96 are mounted on an idler shaft 97 which is journaled, as at 98, 99 in the side walls 83, 84. The conveyor 90 is further characterized by having a series of longitudinally spaced transverse flights 100. The flights 100 are of such width as to extend across the expanse between the side walls 83, 84 and when in the upper run 91 of the conveyor pass through the crop discharge openings 70, 71. As may be seen in Fig. 3, the flights 100, when in the upper flights, ride upon the shelves 62, 63. Also, the flights 100 are substantially the same height as the openings 70, 71. As may be seen from Figs. 3, 4 the flights 100 of the lower run 92 have their lower edges passing adjacent to the floor panel 80 and operate to sweep material from that panel.

The drive mechanism for operating the conveyor includes a sprocket 101 mounted on a shaft 102 which extends into the transmission housing 50. A sprocket 103 is mounted on the shaft 94 and is driven by means of a chain 105 extending between the sprocket 101, 103.

The discharge means will operate in the following manner. The grain normally gravitates to the lower discharge openings 70, 71 and piles on the shelf members 62, 63, as previously mentioned, in the manner indicated by the level line 72, 73. The flights 100 of the upper run 91 will then pass over the shelfes 62, 63. Since there is pressure on the grain from inside the crop drying chambers 27, 28, the grain on the shelves 62, 63 will move internally as the conveyor flights sweep against it and through the opening 66 onto the lower floor panels 80. The flights 100 of the lower run 92 will then sweep the grain from the floor panel 80 to the rear end of the crop drier.

Positioned at the rear end of the crop drier and adjacent the elevator 41 is a hopper 110 having therein a floor panel 111, which is inclined upwardly from the lower end of the elevator 41. Grain moving over the floor 80 of the conveyor 90 will be swept onto the inclined floor 111 from where it will gravitate into the lower end of the elevator 41 to be recirculated in the crop drier or to pass through the discharge spout 44 into an awaiting conveyor or trailer. Referring again to the flights 100 and viewing Fig. 3, it becomes apparent that the outer ends of the flights 100 extend into the crop drying chambers 27, 28. The purpose of having the flights extend therein is to cause agitation within the chambers 27, 28 so that grain will not pack or clog at the lower ends of the chambers. By extending the flights 100 in the manner indicated, there will be created a continuous agitation and a continuous flow of the grain onto the inner ends of the shelf members 62, 63.

In the modification shown in Fig. 5, the sprocket 95, which is shown, and the sprocket 96, not shown, are moved inwardly on the shaft 97 to accommodate a narrower width flight 100*a* on a conveyor 90*a*. The ends of the flight 100*a* are positioned inwardly of the wall panels 60, 61 and also inwardly of the passages 70, 71. The purpose of such a narrow type of conveyor, as compared to that of the wider section as shown in the previous form, is that the flights 100*a* do not extend into the crop drying chambers 27, 28 but are positioned entirely inward of the chambers. Since a normal amount of grinding may occur when the grain comes into direct contact with the chains of the conveyor, it will be in many instances practical to provide the conveyor in the form of Fig. 5 so that the weight of the grain does not fall on moving parts of the conveyor 90*a*. This latter modification does not, of course, have the advantage of providing agitation within the chambers 27, 28 but depends entirely upon gravitational flow through the openings 70, 71. In many instances, due to the type of grain used as well as the characteristics of the grain, agitation will not be necessary and the form of a conveyor used in Fig. 5 will be advantageous. In the modification, the grain is discharged onto the floor panel 80 substantially in the manner previously described relative to the first form of the invention, i.e., the grain flows onto the upper panels 62, 63 and as the flights 100*a* pass over the inner ends of the panels 62, 63 they will tend to sweep the grain over the edges 64, 65 to cause it to gravitate to the floor panel 80 of the conveyor. In the modification, an inclined floor panel 115 extends the length of the conveyor housing and is fixed to the floor panel 80 and side 83 and operates to prevent grain from accumulating in the corner of the housing.

While only one modification of the invention has been shown, undoubtedly other forms and modifications will occur to those skilled in the art. It is therefore to be understood that the present forms were shown and described in detail for purposes of fully and concisely illustrating the principles of the invention. It is not, however, the intention to narrow or limit the invention beyond the broad general nature herein claimed.

What is claimed is:

1. Discharge means for use in a crop drier having a central heating area with inner and upright wall structure adjacent to and generally surrounding the heating area and outer and upright wall structure spaced from the inner wall structure and forming with the latter a pair of upright grain drying chambers on opposite sides of the heating area, said drying chambers converging in inclined relation to one another beneath the heating area, said discharge means comprising: a pair of laterally disposed and substantially parallel shelf members extending the length of the drier and projecting inwardly from the outer wall structure beneath the heating area to respective longitudinally extending and opposed inner edges spaced apart to form an elongated opening; a pair of vertically disposed and elongated panel members disposed above the respective shelf members and having lower terminal edges spaced from the shelf members to form with the shelf members crop discharge openings for the respective crop drying chambers; a laterally disposed floor panel spaced beneath the shelf members; an endless conveyor having upper and lower runs, the upper run disposed over the shelf members and the lower run disposed over the floor panel, said conveyor further including longitudinally spaced transverse flights, the flights on the upper run effecting movement of the crops through the crop discharge openings to the elongated opening between the inner edges of the shelf members for gravitational descent to the floor panel, the flights on the lower run effecting movement of the grain longitudinally over the floor panel; and means on the crop drier for receiving the crop from the lower run.

2. Discharge means for use in a crop drier having a central heating area with inner and upright wall structure adjacent to and generally surrounding the heating area and outer and upright wall structure spaced from the inner wall structure and forming with the latter a pair of upright grain drying chambers on opposite sides of the heating area, said drying chambers converging in inclined relation to one another beneath the heating area, said discharge means comprising: a pair of laterally disposed and substantially parallel shelf members extending the length of the drier and projecting inwardly from the outer wall structure beneath the heating area to respective longitudinally extending and opposed inner edges spaced apart to form an elongated opening; a pair of vertically disposed and elongated panel members extending downwardly from the inner wall structure disposed above the respective shelf members and having lower terminal edges spaced from the shelf members and outwardly respectively of the aforesaid inner edges to form with the shelf members crop discharge openings for the respective crop drying chambers; a laterally disposed floor panel spaced beneath the shelf members; an endless conveyor having upper and lower runs, the upper run disposed over the shelf members and the lower run disposed over the floor panel, said conveyor further including longitudinally spaced transverse flights, the flights on the upper run extending through the discharge openings for effecting movement of the crops through the crop discharge openings to the elongated opening between the inner edges of the shelf members for gravitational descent to the floor panel, the flights on the lower run effecting movement of the grain longitudinally over the floor panel; and means on the crop drier for receiving the crop from the lower run.

3. Discharge means for use in a crop drier having a central heating area with inner and upright wall structure adjacent to and generally surrounding the heating area and outer and upright wall structure spaced from the inner wall structure and forming with the latter a pair of upright grain drying chambers on opposite sides of the heating area, said drying chambers converging in inclined relation to one another beneath the heating area, said discharge means comprising: a pair of laterally disposed and substantially parallel shelf members extending the length of the drier and projecting inwardly from the outer wall structure beneath the heating area to respective longitudinally extending and opposed inner edges spaced apart to form an elongated opening; a pair of vertically disposed and elongated panel members extending downwardly from the inner wall structure disposed above the respective shelf members and having lower terminal edges spaced from the shelf members and outwardly respectively of the aforesaid inner edges to form with the shelf members crop discharge openings for the respective crop drying chambers; a laterally disposed floor panel spaced beneath the shelf members; an endless conveyor having upper and lower runs, the upper run disposed over the shelf members and the lower run disposed over the floor panel, said conveyor further including longitudinally spaced transverse flights, the flights on the upper run having opposite ends terminating at discharge openings, the discharge openings for effecting movement of the crops through the crop discharge openings to the elongated opening between the inner edges of the shelf members for gravitational descent to the floor panel, the flights on the lower run effecting movement of the grain longitudinally over the floor panel; and means on the crop drier for receiving the crop from the lower run.

4. Discharge means for use in a crop drier having a central heating area with inner and upright wall structure adjacent to and generally surrounding the heating area and outer and upright wall structure spaced from the inner wall structure and forming with the latter a pair of upright grain drying chambers on opposite sides of the heating area, said drying chambers converging in inclined relation to one another beneath the heating area, said discharge means comprising: a pair of laterally disposed and substantially parallel shelf members beneath the heating area extending the length of the drier and projecting inwardly from the outer wall structure to respective longitudinally extending and opposed inner edges spaced apart to form an elongated opening; a pair of vertically disposed and elongated panel members disposed above the respective shelf members and having lower terminal edges spaced from the shelf members to form therewith crop discharge openings for the respective crop drying chambers; conveyor means spaced below the shelf means and for receiving crops from the elongated opening; a conveyor disposed over the shelf members including longitudinally spaced transverse flights having opposite ends extending through the discharge openings and into the crop drying chambers for effecting movement of the crops through the crop discharge openings to the elongated opening between the inner edges of the shelf members for gravitational descent into the conveyor means.

5. Discharge means for use in a crop drier having a central heating area with inner and upright wall structure adjacent to and generally surrounding the heating area and outer and upright wall structure spaced from the inner wall structure and forming with the latter a pair of upright grain drying chambers on opposite sides of the heating area, said drying chambers converging in inclined relation to one another beneath the heating area, said discharge means comprising: a pair of laterally disposed and substantially parallel shelf members beneath the heating area extending the length of the drier and projecting inwardly from the outer wall structure to respective longitudinally extending and opposed inner edges spaced apart to form an elongated opening; a pair of vertically disposed and elongated panel members disposed above the respective shelf members and having lower terminal edges spaced from the shelf members to form therewith crop discharge openings for the respective crop drying chambers, conveyor means spaced below the shelf means and for receiving crops from the elongated opening; a conveyor disposed over the shelf members including longitudinally spaced transverse flights having opposite ends terminating substantially at the discharge openings for effecting movement of the crops through the crop discharge openings to the elongated opening between the inner edges of the shelf members for gravitational descent into the conveyor means.

6. Discharge means for use in a crop drier having a central heating area with inner and upright wall structure adjacent to and generally surrounding the heating area and outer and upright wall structure spaced from the inner wall structure and forming with the latter a pair of upright grain drying chambers, on opposite sides of the heating area, said drying chambers converging in inclined relation to one another beneath the heating area, said discharge means comprising: a pair of laterally disposed and substantially parallel shelf members beneath the heating area extending the length of the drier and projecting inwardly from the outer wall structure to respective longitudinally extending and opposed inner edges spaced apart to form an elongated opening; a pair of vertically disposed and elongated panel members disposed above the respective shelf members extending downwardly from the inner wall structure and having lower terminal edges spaced from the shelf members outwardly respectively of the edges forming the elongated opening to form with the shelf members crop discharge openings for the respective crop drying chambers; a laterally disposed floor panel spaced beneath the shelf members; an endless conveyor having upper and lower runs, the upper runs disposed adjacent to and over the shelf members and the lower run disposed over the floor panel, said conveyor further including longitudinally spaced transverse flights, the flights on the upper run effecting movement of the crops through the crop discharge openings to the elongated opening, and the flights on the lower run effecting movement of the grain longitudinally over the floor panel.

7. The invention defined in claim 6 in which the flights are of substantially the same height as the discharge openings.

8. The invention defined in claim 6 in which the height of the discharge openings is less than the extension of the shelf members inwardly of the discharge openings.

9. The invention defined in claim 6 further characterized by the flights of the upper run having opposite ends inwardly of the discharge openings.

10. The invention defined in claim 6 further characterized by the flights of the upper run having opposite end portions extending through the respective discharge openings and into the crop drying chambers.

11. Discharge means for use in a crop drier having a heating area with an inner and upright wall structure adjacent to the heating area and outer and upright wall structure spaced from the inner wall structure and forming with the latter an upright grain drying chamber, said discharge means comprising: a laterally disposed shelf rigid with and projecting inwardly from one of the wall structures to an edge disposed beyond the lower terminal edge of the other wall structure, said lower terminal edge being spaced vertically from the shelf to form therewith a longitudinal crop discharge opening for the crop drying chamber; and a longitudinal conveyor disposed over the shelf proximate the opening and having flight means thereon moving on the shelf to effect movement of the grain through the crop discharge opening.

References Cited in the file of this patent

UNITED STATES PATENTS

| | | |
|---|---|---|
| 1,219,816 | French | Mar. 20, 1917 |
| 2,748,993 | Forrest | June 5, 1956 |

FOREIGN PATENTS

| | | |
|---|---|---|
| 875,902 | France | July 7, 1942 |